US006404788B1

United States Patent
Choi et al.

(10) Patent No.: US 6,404,788 B1
(45) Date of Patent: Jun. 11, 2002

(54) CR AND YB CODOPED OPTICAL MATERIAL SYSTEMS FOR ENHANCED INFRARED FLUORESCENCE EMISSION AND THEIR APPLICATION SCHEMES

(75) Inventors: Yong Gyu Choi; Kyong Hon Kim; Hak Kyu Lee; Dong Sung Lim, all of Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/373,968

(22) Filed: Aug. 13, 1999

(30) Foreign Application Priority Data

Nov. 19, 1998 (KR) ............................................. 98-49844

(51) Int. Cl.[7] ................................................. H01S 3/14
(52) U.S. Cl. ............................ 372/39; 372/40; 372/41; 372/6; 372/64
(58) Field of Search .............................. 372/39–41, 6, 372/10, 64; 252/301.21

(56) References Cited

U.S. PATENT DOCUMENTS

| | | | | |
|---|---|---|---|---|
| 3,725,811 A | * | 4/1973 | Murphy | 331/94.5 |
| 4,932,031 A | | 6/1990 | Alfano et al. | |
| 4,962,067 A | * | 10/1990 | Myers | 252/301.21 |
| 4,987,575 A | * | 1/1991 | Alfano et al. | 372/41 |
| 5,119,382 A | * | 6/1992 | Kennedy et al. | 372/10 |
| 5,226,049 A | * | 7/1993 | Grubb | 372/40 |
| 5,280,492 A | * | 1/1994 | Krupke et al. | 372/41 |
| 5,717,517 A | * | 2/1998 | Alfano et al. | 372/41 |
| 6,292,292 B1 | * | 1/2001 | Garito et al. | 372/6 |

OTHER PUBLICATIONS

Spectroscopic Investigation of $Cr^{+4}$ –Doped Glasses by K. Richardson, pp. 52–55, OSA Proceedings on Advanced Solid State Lasers, 1992, vol. 13.

Compositional Dependence of the Luminescence from $Cr^{+4}$ – Doped Calcium Aluminate Glass by X. Wu; Journal of Luminescence; pp. 285–289.

Compositional Dependence of the valency state of Cr ions in oxide glasses by T. Murata. pp. 139–146; Journal of Non-Crystalline Solids.

Excited–state absorption and stimulated emission measurements in $Cr^{+4}$ : forsterite by N.V. Kuleshov et al.; Journal of Luminescence, pp. 319–325.

* cited by examiner

Primary Examiner—Leon Scott, Jr.
(74) Attorney, Agent, or Firm—Blakely Sokoloff Taylor & Zafman

(57) ABSTRACT

Provided are complex optical material that trivalent ytterbium ion is codoped into single crystalline, poly crystalline or amorphous material containing tetravalent chromium ion or trivalent vanadium ion as an active medium, and a using method of the material. In application of the material to solid-state lasers, optical fiber amplifiers and the likes, when excitation occurs in the 980 nm wavelength band in which absorption strongly occurs at the ytterbium ion with avoiding the wavelength range of 600~800 nm in which the excited-state absorption occurs at the chromium ion, the energy is transferred from the ytterbium ion to the chromium ion to emit fluorescence in the range of 1200~1600 nm wavelength. Accordingly, the present invention is to solve the problem of the excitation efficiency decrease of the tetravalent chromium ion due to the excited-state absorption and to enhance the fluorescence emission intensity.

17 Claims, 4 Drawing Sheets

CR AND YB CODOPED OPTICAL MATERIAL SYSTEMS FOR ENHANCED INFRARED FLUORESCENCE EMISSION AND THEIR APPLICATION SCHEMES

FIELD OF THE INVENTION

The present invention relates to chromium ion doped complex optical material for enhanced infrared fluorescence emission and a using method thereof. Particularly, the present invention relates to complex optical material that trivalent (+3) ytterbium ion and tetravalent (+4) chromium ion are codoped as active media into single crystalline, poly crystalline or amorphous material and relates to a using method thereof in which the media are not excited at the range between 600 nm and 800 nm wavelength but at the wavelength band of about 980 nm. At the former wavelength range, excited-state absorption is occurred in the chromium ion, but at the latter wavelength, absorption is strongly occurred in the ytterbium ion. The optical material of the present invention can be applied to solid-state lasers, optical amplifiers and the likes. When excitation is occurred in the optical material at the wavelength band, the energy is transferred from the ytterbium ion to the chromium ion to produce fluorescence in the band between 1200 nm and 1600 nm wavelength. Therefore, the efficiency of fluorescence emission can be enhanced.

DESCRIPTION OF THE PRIOR ART

Chromium ion has several oxidation numbers and is the stablest in trivalent (+3) state among the oxidation states. It has been known lately that the tetravalent (+4) state can be stably formed in crystalline and glass system.

Particularly, U.S. Pat. No. 4,932,031 discloses solid-state laser consisted of chromium doped single crystalline medium and a resonance oscillator operating in the range between 1150 nm and 1350 nm wavelength.

U.S. Pat. No. 4,987,575 also discloses a laser operating in the infrared region of 1~2 micron and tetravalent chromium ion doped laser material. As stable tetravalent chromium ion doped crystalline material, the patent suggests olivine-like structure of (A) (RE)GeO$_4$ (wherein, A is Na or Li, RE is Y, La or Gd) or willemite structure of Zn$_2$(Si or Ge) O$_4$.

Meanwhile, as stable tetravalent chromium ion doped amorphous material, CaO—Al$_2$O$_3$—MgO and CaO—Al$_2$O$_3$—SiO$_2$ systems have been published.

U.S. Pat. No. 5,119,382 also discloses a new Q-switch using tetravalent chromium ion doped crystalline material.

U.S. Pat. No. 5,717,517 also discloses a polymer optical fiber amplifier in which fine crystalline containing tetravalent chromium or trivalent vanadium ion is dispersed.

However, the fluorescence lifetime of near infrared wavelength emission of the tetravalent chromium ion doped materials is very short (See, K. Cerqua-Richardson, et al., "Spectroscopic Investigation Cr$^{4+}$-Doped Glasses", *OSA Proceedings on Advanced Solid-State Lasers*, 13, pp 52–55 (1992)). Excited-state absorption also occurs in the wide wavelength range of 600~800 nm. In the wavelength band between 600 nm and 800 nm, ground-state absorption strongly occurs. However when excitation occurs in the wavelength band, the efficiency of laser may be deteriorated due to the excited-state absorption (See, N. V. Kuleshov, et al., "Excited-state absorption and stimulated emission measurements in Cr$^{4+}$:forsterite", *Journal of Luminescence*, 75, pp 319–325 (1997)).

SUMMARY OF THE INVENTION

It is, therefore, an object of the present invention to provide chromium and ytterbium ion codoped complex optical material, which can increase the excitation efficiency and thereby enhancing the fluorescence emission intensity in the infrared wavelength range.

It is another object of the present invention to provide a using method of complex optical material, in which the fluorescence emission efficiency can be enhanced by using the optical material with exciting the media in the absorption wavelength band of the ytterbium ion. That is, the present invention is to enhance excitation efficiency of tetravalent chromium ion by using the trivalent ytterbium ion which is long in fluorescence lifetime and has large absorption cross-section in the narrow wavelength centered at ~980 nm. In the present invention, the energy is not directly absorbed by the chromium ion, but by the ytterbium ion and then is transferred from the ytterbium ion to the chromium ion to emit fluorescence.

In accordance with one embodiment of the present invention, there are provided complex optical material that trivalent ytterbium ion is codoped into single crystalline, poly crystalline or amorphous material using tetravalent chromium ion as an active medium.

Here, it is preferable that the concentration of the ytterbium ion should be larger than that of the chromium ion in the material. More preferably, the chromium ion is doped with the amount between 0.01 mol % and 0.1 mol %, the ytterbium ion is codoped with the amount between 0.05 mol % and 2 mol %, and the amount of the ytterbium ion is 5 to 200 times more than that of the chromium ion. Most preferably, the amount of the ytterbium ion is 20 to 100 times more than that of the chromium ion.

The complex optical material may be used for laser resonance oscillators, saturable absorbers, optical fiber amplifiers, planar waveguide amplifiers or the likes.

The complex optical material produces fluorescence in the range between 1200 nm and 1600 nm wavelength.

In the complex optical material, the absorption wavelength band of the ytterbium ion is used as excitation wavelength. Here, among the absorption wavelength band, the preferable wavelength range is between 850 nm and 1050 nm, and the more preferable wavelength range is between 970 nm and 990 nm.

Meanwhile, the chromium ion may be replaced by trivalent (+3) vanadium ion.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

The invention will be illustrated in detail by the following preferred embodiments with reference to the accompanying drawings.

Figure 1:
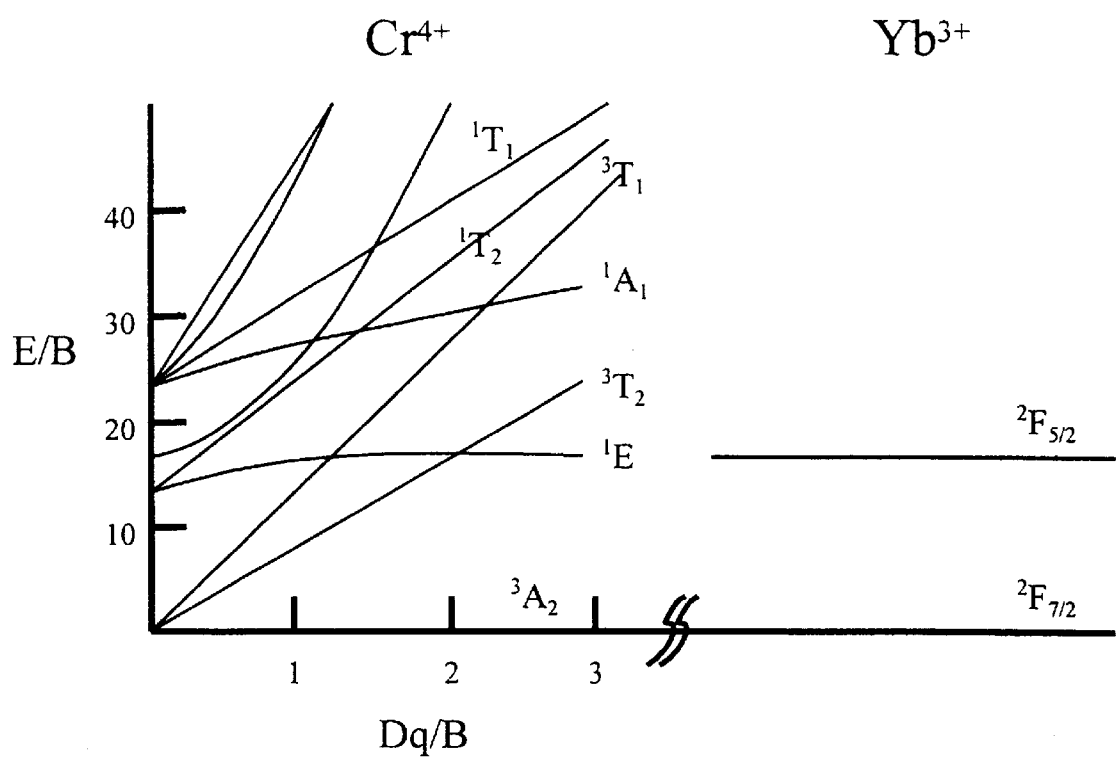
FIG. 1 is a graph showing the schematic energy levels of the tetravalent chromium ion in the four-fold crystal field and trivalent ytterbium ion.

FIG. 1 shows the change of energy level in pursuant to the intensity of the crystal field having $T_d$ symmetry.

Tetravalent chromium ion has $3d^2$ electron configuration and is four-fold coordinated in all materials. Here, the electronic energy level is largely changed according to the intensity of the crystal field. Generally occurs spin-allowed transition, $^3A_2 \rightarrow ^3T_2$ transition (900~1200 nm) and spin and electric dipole allowed transition, $^3A_2 \rightarrow ^3T_1$ transition (600~850 nm) from the ground level to show absorption in the wide range between about 600 nm and 1200 nm wavelength.

In the case of excitation in the range of 600~800 nm wavelength, the excited-state absorption occurs to decrease the efficiency of laser or amplifier. Thus, the wavelength range is not desirable as excitation wavelength. Also the absorption cross-section in the range of 900~1200 nm is relatively small.

Meanwhile, the fluorescence lifetime of $^3T_2 \rightarrow ^3A_2$ transition emitting fluorescence in the range of 1200~1600 nm wavelength is very short at room temperature mainly due to the influence of multiphonon relaxation. For example, the fluorescence lifetime of the chromium ion is about 4 micro second in representative tetravalent chromium ion containing crystal, chromium:forsterite crystal, and the fluorescence lifetime of the chromium ion doped aluminate glass is about 0.5~30 micro second. Thus, in the case of applying to lasers or amplifiers, the efficiency is relatively low.

When the Dq value, which is a scale of the crystal field intensity, is given to specific value, $^3T_2$ level and $^1E$ level are intersected with each other. In the case of the crystal field intensity of the host material being smaller than the value, the wavelength of the fluorescence emitted from the chromium ion reaches up to about 1600 nm, while in the case of the crystal field intensity being larger, the wavelength of the fluorescence is in the range of 1200~1450 nm.

Figure 2:
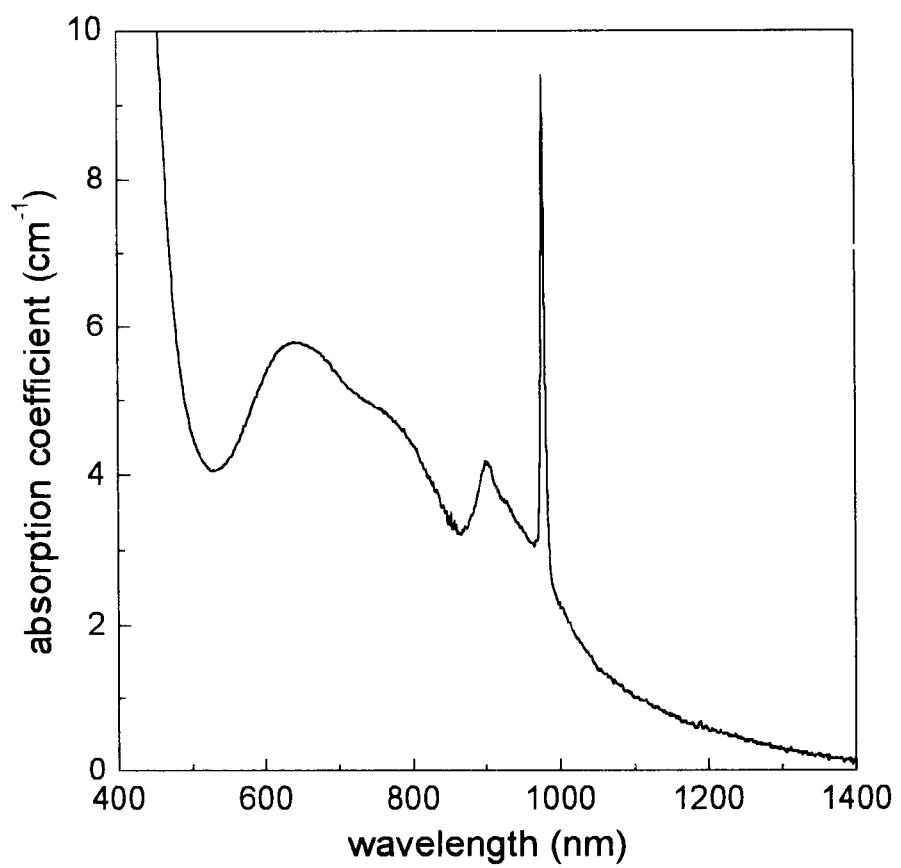
FIG. 2 is a graph showing the absorption spectrum of glass codoped with Cr$^{4+}$/Yb$^{3+}$.

FIG. 2 is a graph showing the absorption spectrum obtained from $CaO$—$Al_2O_3$—$BaO$—$ZnO$ glass codoped with tetravalent chromium ion and trivalent ytterbium ion. $^2F_{7/2} \rightarrow ^2F_{5/2}$ absorption transition of the ytterbium ion is shown in the wavelength range of 850~1050 nm, particularly, strong absorption is shown in the range of 970~990 nm. Therefore, when excitation occurs at the wavelength compliant with the absorption wavelength band of the ytterbium ion, preferably, at the wavelength of 980 nm semiconductor lasers or titanium:sapphire lasers, the energy is transferred from the ytterbium ion to the chromium ion. At this, the energy transfer to the chromium ion occurs very effectively, because spontaneous radiation transition rate of $^2F_{5/2}$ level of the ytterbium ion is as small as 500~1000 $s^{-1}$ in the common silicate and aluminate glasses.

Figure 3:
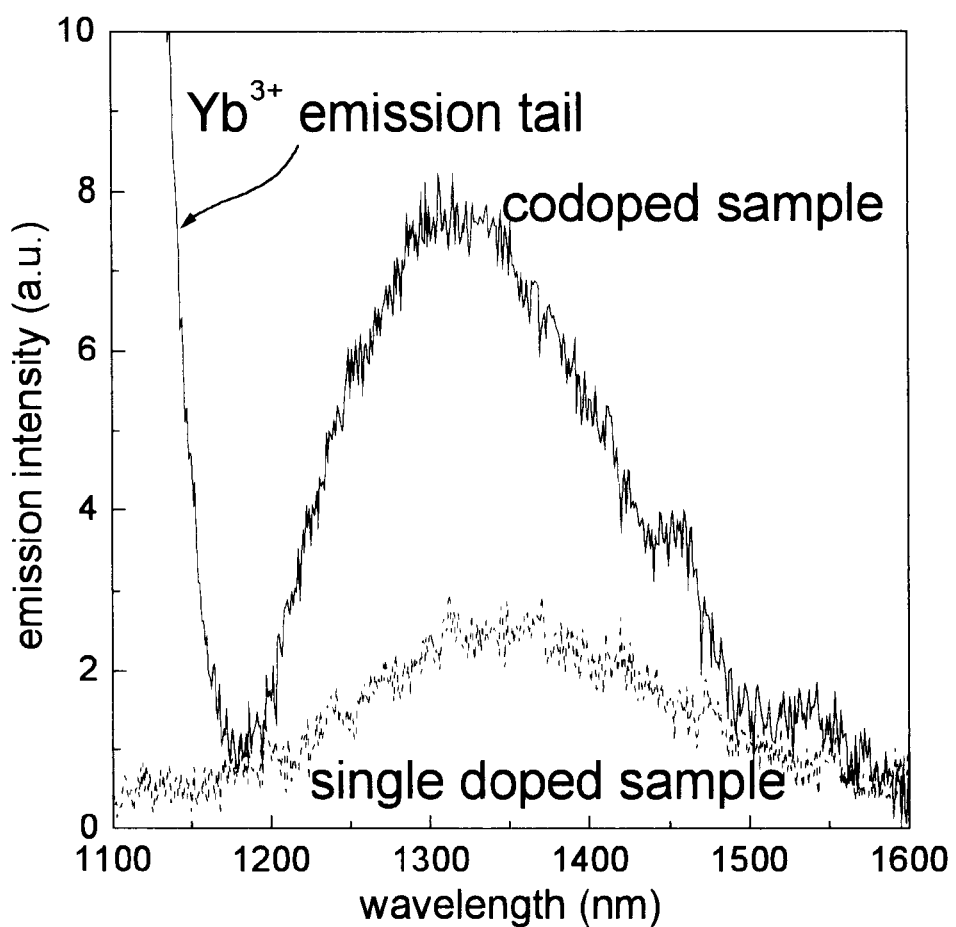
FIG. 3 is a graph showing the enhanced fluorescence emission of 0.01 mole % Cr$_2$O$_3$/1.0 mole % Yb$_2$O$_3$ codoped glass compared to that of glass singly doped with the same amount Cr$_2$O$_3$.

FIG. 3 is a graph showing the fluorescence emission spectrum generated in the $CaO$—$Al_2O_3$—$BaO$—$ZnO$ glass codoped with 0.01 mole % $Cr_2O_3$ and 1.0 mole % $Yb_2O_3$ as an example of $Cr^{4+}/Yb^{3+}$ codoped material. An enhanced fluorescence emission in intensity is evident in the codoped sample compared to single-doped sample with the same amount of $Cr_2O_3$. Since the material suggested by the embodiment has the strong crystal field intensity, the tetravalent chromium ion is located to high-field site and thus, the generated fluorescence wavelength becomes about 1200~1450 nm. However, if the crystal field intensity is weak for the chromium ion to be located to low-field site, the emitted fluorescence wavelength may reach up to 1600 nm.

Meanwhile, since transition metal ion including the chromium ion is much larger in extinction coefficient for the visible ray than the ion of rare earth element, doping it into the host materials with a large amount results in much scattering and absorption loss. Therefore, it is difficult to align laser resonance oscillators and in addition it is not easy to manufacture optical fibers.

In the transition metal ion, the valence electrons are so located in the outmost subshell, i.e., 3d orbital that the electronic energy is very sensitive to the change of the host composition and trend of covalent bond character with proximate anion is large. While in the rare earth element ion, the 4f orbital is so hindered by the outmost subshell, i.e., 5d and 6s orbital that the electronic energy is relatively not affected to the change of the host composition and trend of ionic bond character with proximate anion is strong. These characteristics are importantly operated in the case of manufacturing thin film or optical fiber type waveguide. For example, rare earth element ion such as Er, Nd or Yb has been already successfully doped in optical fibers and thin film type amplifiers. However, the research and development for use of the transition metal ion as an active medium is scarcer than that for use of rare earth element. On the other hand, a significant ground state absorption between 1200~1500 nm takes place even in a glass doped with low concentration of Cr. i.e., 0.1 mole % $Cr_2O_3$, which re-absorbs $Cr^{4+}$: $^3T_2 \rightarrow ^3A_2$ luminescence responsible for the 1200~1600 nm fluorescence an corresponding quantum efficiency.

Accordingly, in consideration of utilization, the amount of the doped transition metal ion should be as low as possible. In this case, introducing another ion as a sensitizer can induce harmonious absorption and energy transfer. In the present invention, trivalent ytterbium ion is codoped into single crystalline, poly crystalline or amorphous material using the tetravalent chromium ion as an active medium. Wherein, it is preferable that the amount of the chromium ion should be 0.01~0.1 mol %, that of the ytterbium ion be 0.05~2 mol %, and that of the ytterbium ion be 5~200 times more than that of the chromium ion. More preferably, the amount of the ytterbium ion is 20~100 times more than that of the chromium ion.

Figure 4A:
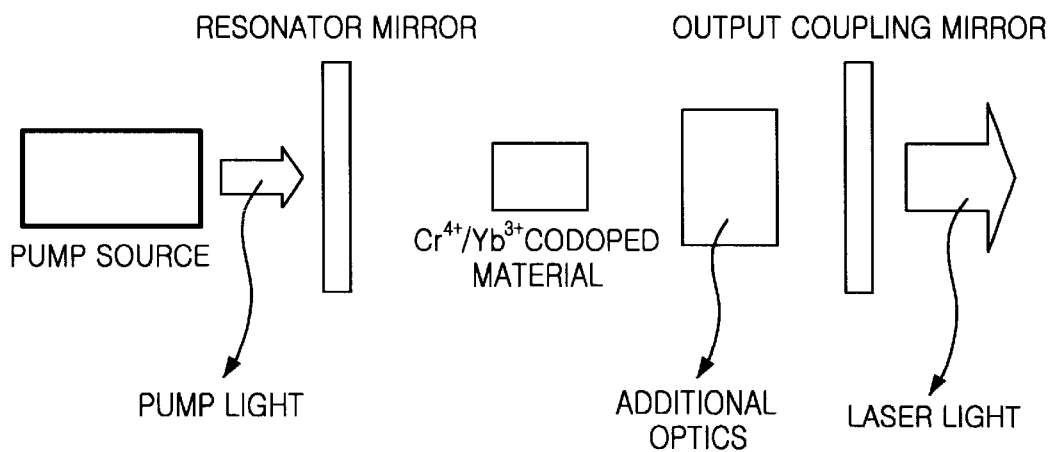
FIG. 4A is a laser resonance oscillator as an applied example of Cr$^{4+}$/Yb$^{3+}$codoped material.
Figure 4B:
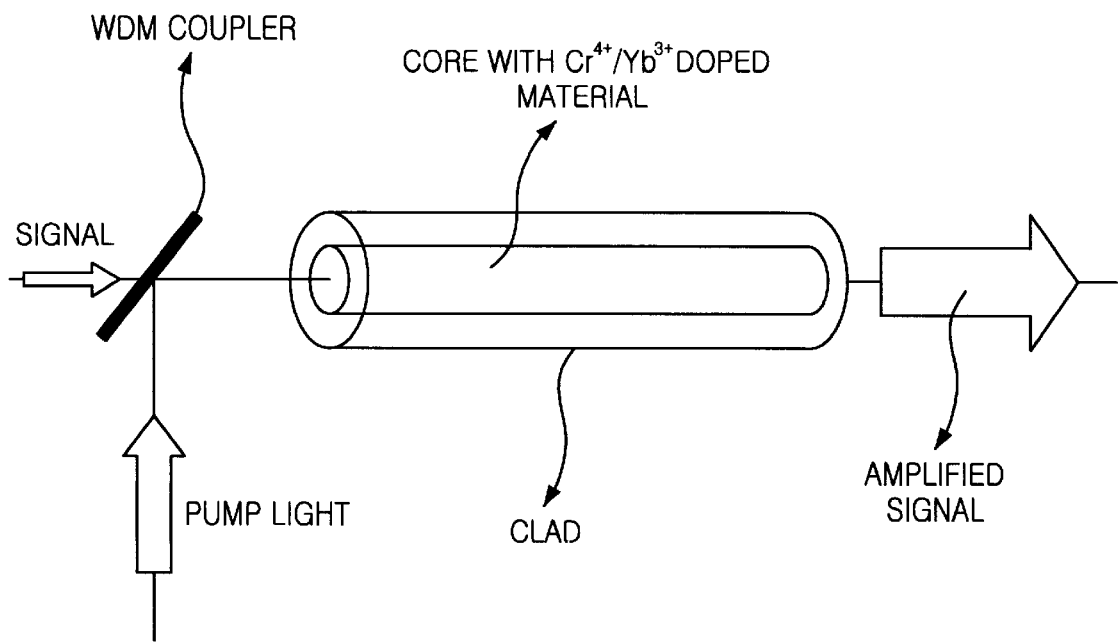
FIG. 4B is a broadband optical fiber amplifier as another applied example of Cr$^{4+}$/Yb$^{3+}$ codoped material.

The complex optical material according to the invention can be used as a major component of lasers and optical fiber amplifiers as suggested in FIGS. 4A and 4B. Here, the laser material is crystalline or amorphous material codoped with the chromium and ytterbium. The optical fiber material is the form that the crystal codoped with the chromium and ytterbium is dispersed in glass or polymer material, or is glass itself in the case of the host material made of glass. In the laser and optical fiber amplifier, it is preferable to use, as an excitation wavelength, 980 nm wavelength band in which the absorption of ytterbium ion occurs strongly, with avoiding the wavelength range of 600~800 nm in which the excited-state absorption occurs.

The optical material of the present invention can be applied to saturable absorbers generating Q-switching of laser and thin film waveguide type amplifiers.

In the above description, although the tetravalent chromium ion is illustrated for understanding of the invention, trivalent vanadium ion may be applied instead of the tetravalent chromium ion. This is because the trivalent vanadium ion has the same electronic configuration as the tetravalent chromium ion and they may emit fluorescence in the similar wavelength range if they are located the same crystal field site.

While the present invention has been described with respect to certain preferred embodiments only, other modifications and variations may be made without departing from the spirit and scope of the present invention as set forth in the following claims.

What is claimed is:

1. A complex optical material comprising:

trivalent (+3) ytterbium ion and at least one of tetravalent (+4) chromium ion and trivalent (+3) vanadium ion codoped into at least one of a material selected from the group consisting of a single crystalline, a poly crystalline and an amorphous material in which the at least one of the tetravalent (+4) chromium ion and the trivalent (+3) vanadium ion comprises an active medium.

2. The complex optical material according to claim 1, wherein an amount of the ytterbium ion is more than an amount of the at least one of chromium ion and the vanadium ion.

3. A method comprising:

providing a complex optical material according to claim 2, wherein the material is incorporated in a device selected from the group consisting of one of a laser resonance oscillator, a saturable absorber, an optical fiber amplifier and a planar waveguide amplifier; and exciting the complex optical material.

4. The complex optical material according to claim 1, wherein the at least one of the chromium ion and the vanadium ion is doped in an amount between 0.01 mol % and 0.1 mol % and 0.1 the ytterbium ion is codoped in an amount between 0.05 mol % and 2 mol %, and the amount of the ytterbium ion is 5 to 200 times more than the amount of the at least one of chromium ion and the vanadium ion.

5. The complex optical material according to claim 3, wherein the amount of the ytterbium ion is 20 to 100 times more than that of the at least one of the chromium ion and the vanadium ion.

6. A method comprising: providing providing a complex optical material according to claim 5, wherein the material is incorporated in a device selected from the group consisting of a laser resonance oscillator, a saturable absorber, an optical fiber amplifier and a planar waveguide amplifier; and exciting the complex optical material.

7. The complex optical material according to claim 3 wherein the complex optical material emits fluorescence in a range between 1200 nm and 1600 nm wavelength.

8. A method comprising:

providing a complex optical material according to claim 4, wherein the material is incorporated in a device selected from the group consisting of a laser resonance oscillator, a saturable absorber, an optical fiber amplifier and a planar waveguide amplifier; and exciting the complex optical material.

9. A method comprising:

providing a complex optical material according to claim 1, wherein the material is incorporated in a device selected from the group consisting of a laser resonance oscillator, a saturable absorber, an optical fiber amplifier and a planar waveguide amplifier; and exciting the complex optical material.

10. A method comprising:

using a complex optical material comprising trivalent (+3) ytterbium ion aid one of tetravalent (+4) chromium ion and trivalent (+3) vanadium ion codoped into at least one of a single crystalline, poly crystalline and amorphous material in which the at least one of the tetravalent (+4) chromium ion and the trivalent (+3) vanadium ion is used as an active medium, wherein said absorption wavelength band of the ytterbium ion is used is an excitation wavelength for inversion of electron population of the active ion.

11. The method according to claim 10, wherein an amount of the ytterbium ion is more than that of an amount of the one of the chromium ion and the vanadium ion.

12. The method according to claim 11, wherein among the absorption wavelength band, a wavelength in a range between 970 nm and 990 nm is used as an excitation wavelength.

13. The method according to claim 10, wherein the one of the chromium ion and the vanadium ion is doped in an amount between 0.01 mol % and 0.1 mol %, the ytterbium ion is codoped in an amount between 0.05 mol % and 2 mol %, and the amount of the ytterbium ion is 5 to 200 times more than that of the one of the chromium ion and the vanadium ion.

14. The method according to claim 13, wherein the amount of the ytterbium ion is 20 to 100 times more than that of the one of the chromium ion and the vanadium ion.

15. The method according to claim 14, wherein among the absorption wavelength band, a wavelength in a range between 970 nm and 990 nm is used as an excitation wavelength.

16. The method according to claim 13, wherein among the absorption wavelength band, a wavelength in a range between 970 nm and 990 nm is used as an excitation wavelength.

17. The method according to claim 10, wherein among the absorption wavelength band, a wavelength in a range between 970 nm and 990 nm is used as an excitation wavelength.

* * * * *